(12) United States Patent
Chou et al.

(10) Patent No.: US 10,094,049 B2
(45) Date of Patent: *Oct. 9, 2018

(54) FABRICATING METHOD FOR SPUNBOND NONWOVEN FROM NATURAL CELLULOSE FIBER BLENDED WITH NANO SILVER

(71) Applicant: Acelon Chemicals and Fiber Corporation, Changhua County (TW)

(72) Inventors: Wen-Tung Chou, Changhua County (TW); Ming-Yi Lai, Changhua County (TW); Kun-Shan Huang, Tainan (TW); Shao-Hua Chou, Taichung (TW); Meng-Heng Hsieh, Tainan (TW)

(73) Assignee: ACELON CHEMICALS AND FIBER CORPORATION, Changhua County (TW)

(*) Notice: Subject to any disclaimer, the term of this patent is extended or adjusted under 35 U.S.C. 154(b) by 309 days.

This patent is subject to a terminal disclaimer.

(21) Appl. No.: 14/939,173

(22) Filed: Nov. 12, 2015

(65) Prior Publication Data

US 2016/0333508 A1  Nov. 17, 2016

(30) Foreign Application Priority Data

May 11, 2015  (TW) .............................. 104114987 A

(51) Int. Cl.
  *D04H 1/425* (2012.01)
  *D04H 1/4282* (2012.01)
  (Continued)

(52) U.S. Cl.
  CPC ............... *D01D 5/088* (2013.01); *D01D 1/02* (2013.01); *D01D 5/08* (2013.01); *D01F 1/103* (2013.01);
  (Continued)

(58) Field of Classification Search
  CPC ............ D01D 5/088; D01D 1/02; D01D 5/08; D04H 3/013; D01F 2/00; D01F 1/103; B82Y 30/00; D10B 2201/01
  See application file for complete search history.

(56) References Cited

U.S. PATENT DOCUMENTS 6,379,712 B1    4/2002 Yan et al.
6,979,491 B2   12/2005 Yan et al.
(Continued)

*Primary Examiner* — Robert J Grun
(74) *Attorney, Agent, or Firm* — Bacon & Thomas, PLLC

(57) ABSTRACT

The present invention provides a fabricating method for spunbond nonwoven from natural cellulose fiber blended with nano silver, which comprises following steps.

Firstly, prepare nano silver colloidal sol by reduction titration for mixture of polyvinyl alcohol (PVA), silver nitrate ($AgNO_3$) and sodium borohydride ($NaBH_4$).

Secondly, prepare mixing cellulose serum by blending agitation for mixture of wood pulp, N-methylmorpholine N-oxide (NMMO) and stabilizer.

Thirdly, prepare blending mucilage from mixing cellulose serum via blending process.

Fourthly, produce spinning dope by blending and dehydrating the nano silver colloidal sol and mixing cellulose serum.

Fifthly, produce molten filament tow by spunbond spinning method in association with coagulation, regeneration, water rinse and high-speed stretching process.

Finally, by post treatments of hydro-entangled needle punching, drying, winding-up processes in proper order, obtain final product of spunbond nonwoven from natural cellulose fiber blended with nano silver, which is biodegradable with features of antibacterial and antistatic capabilities.

6 Claims, 5 Drawing Sheets

(51) Int. Cl.
   *D04H 1/48*     (2012.01)
   *D04H 1/413*    (2012.01)
   *D01D 5/08*     (2006.01)
   *D01D 5/088*    (2006.01)
   *D01D 1/02*     (2006.01)
   *D01F 1/10*     (2006.01)
   *D01F 2/00*     (2006.01)
   *D04H 3/013*    (2012.01)
   *B82Y 30/00*    (2011.01)

(52) U.S. Cl.
   CPC .............. *D01F 2/00* (2013.01); *D04H 3/013* (2013.01); *B82Y 30/00* (2013.01); *D10B 2201/01* (2013.01)

(56) References Cited

U.S. PATENT DOCUMENTS

| | | |
|---|---|---|
| 7,410,650 B2 | 8/2008 | Lin |
| 2008/0299160 A1 | 12/2008 | Agboh et al. |
| 2010/0124861 A1 | 5/2010 | Wendler et al. |
| 2012/0215148 A1 | 8/2012 | Ewert et al. |
| 2016/0333498 A1* | 11/2016 | Chou ................. B29B 7/002 |
| 2016/0333499 A1* | 11/2016 | Chou ................. D01F 2/02 |

\* cited by examiner

FABRICATING METHOD FOR SPUNBOND NONWOVEN FROM NATURAL CELLULOSE FIBER BLENDED WITH NANO SILVER

FIELD OF THE PRESENT INVENTION

The present invention relates to a fabricating method for spunbond nonwoven from natural cellulose fiber blended with nano silver, particularly for one belonging to eco-friendly process in producing nonwoven from natural cellulose, whose process comprises following steps in proper order: prepare nano silver colloidal sol, prepare mixing cellulose serum, produce spinning dope, produce molten filament tow by spunbond spinning method, produce fibrous web of nonwoven substrate, and by post treatments of hydro-entangled needle punching, drying, winding-up processes in proper order, obtain final product of spunbond nonwoven from natural cellulose fiber blended with nano silver, which is biodegradable with features of antibacterial and antistatic capabilities.

BACKGROUND OF THE INVENTION

The techniques available for fabricating chemical fiber by blending nano silver colloidal sol with polymer fiber are disclosed as in Mainland China Patent Applications in filed numbers of 200410062799.3, 200510070895.7, 201010230063.8, 201010285121.7 and 201310523647.8 et cetera. However, the wastes of nonwoven from spent chemical fiber of blending nano silver colloidal sol with polymer fiber aforesaid not only cause tremendous impact and burden to the environment but also discharge harmful drained materials because they are not biodegradable. Moreover, the antibacterial and sterilization abilities for nonwoven from the chemical fiber of blending nano silver colloidal sol with polymer fiber aforesaid are dispersedly divergent beyond processed control, which can not meet precise requirement of industrial application. Therefore, how to produce a nonwoven from natural cellulose fiber blended with nano silver having uniform and consistent antibacterial, sterilization and anti-static-electricity abilities as well as biodegradable features under precisely manufacturing parameters becomes critical and impending issue for the industry, which is also the target of our present invention.

SUMMARY OF THE INVENTION

The primary object of the present invention is to provide a fabricating method for spunbond nonwoven from natural cellulose fiber blended with nano silver, which comprises following steps:

a. Prepare nano silver colloidal sol by reduction titration for mixture of polyvinyl alcohol (PVA), silver nitrate ($AgNO_3$) and sodium borohydride ($NaBH_4$);

b. Prepare mixing cellulose serum by blending agitation for mixture of wood pulp, N-methylmorpholine N-oxide (NMMO) and stabilizer;

c. Prepare blending mucilage from mixing cellulose serum via blending process;

d. Produce spinning dope by blending and dehydrating the nano silver colloidal sol and mixing cellulose serum;

e. Produce molten filament tow by spunbond spinning method in association with coagulation, regeneration, water rinse and high-speed stretching process.

f. By post treatments of hydro-entangled needle punching, drying, winding-up processes in proper order, obtain final product of spunbond nonwoven from natural cellulose fiber blended with nano silver, which is biodegradable with features of antibacterial and antistatic capabilities.

With foregoing process steps, by means of controlling the particle size and concentration of the nano silver colloidal sol, obtained spunbond nonwoven from natural cellulose fiber blended with nano silver will has good antibacterial capability, which is not only meet the precise requirement of uniform and consistent antibacterial and sterilization from industrial application but also effectively inhibit and eradicate the proliferation and growth of the microorganism including bacteria, mold or fungus so that it is beneficial to promote healthful, clean and comfortable life because the disease spread is practically controlled in consequence of the prevention from bacterial cross infection.

The other object of the present invention is to provide a fabricating method for spunbond nonwoven from natural cellulose fiber blended with nano silver to produce a final product of natural cellulose fiber blended with nano silver with antistatic and biodegradable features. With antistatic feature, the natural cellulose fiber blended with nano silver of the present invention effectively avoids negative impact to the human physiological blood circulation, immune system and nervous system from static effect during wearing and taking-off clothes in winter season. Whereas, with biodegradable feature, the natural cellulose fiber blended with nano silver of the present invention, the tremendous impact and burden to the environment caused by the wastes from spent conventional chemical fiber counterparts can be totally eradicated.

DETAILED DESCRIPTION OF THE PREFERRED EMBODIMENTS

For further disclosing the fabricating process and effects of the present invention, following preferred exemplary embodiments in associated figures are detailed presented as below.

Please refer to FIGS. 1 to 4, the "fabricating method for spunbond nonwoven from natural cellulose fiber blended with nano silver" of the present invention comprises following steps.

Figure 1:
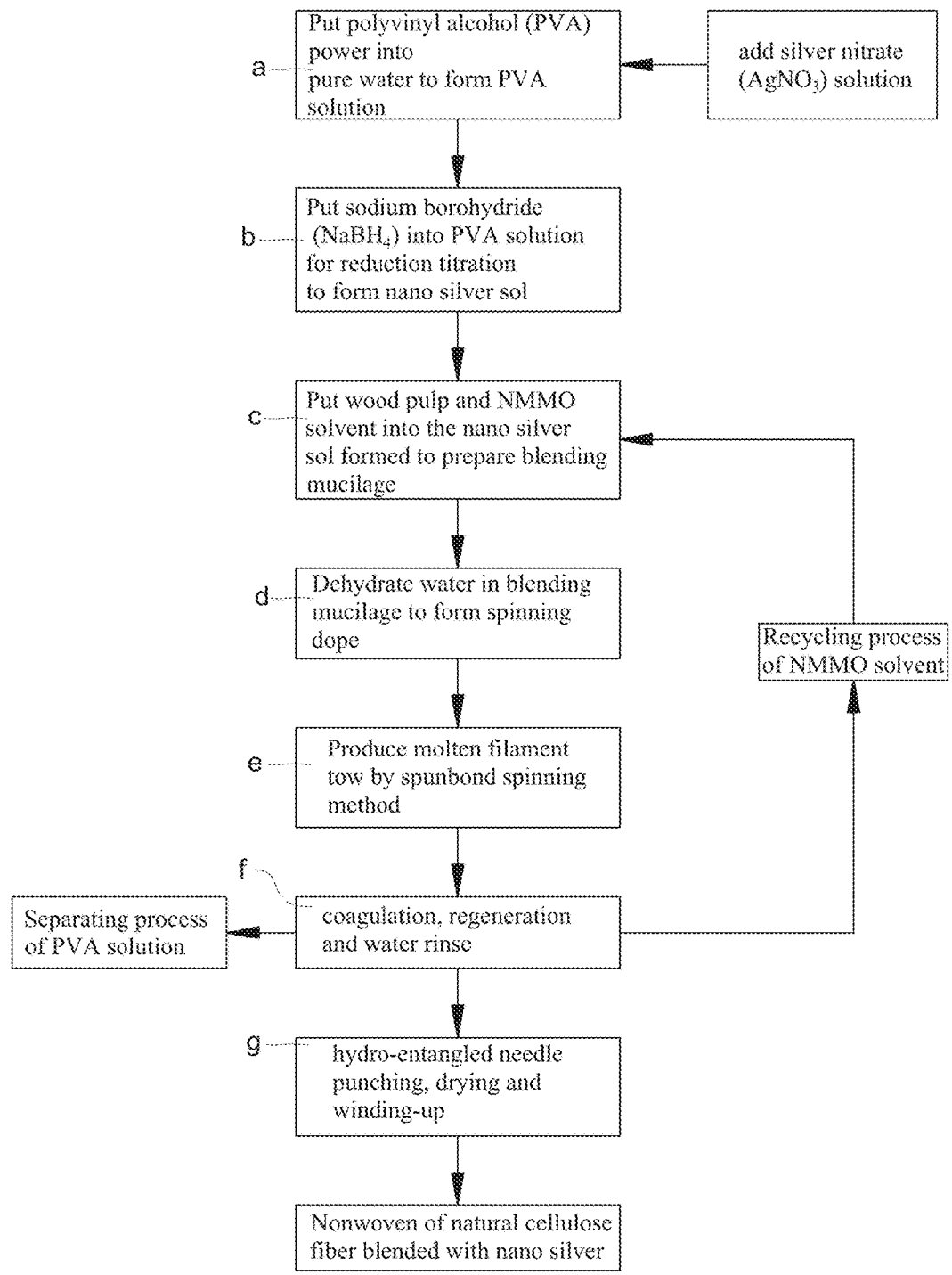
FIG. 1 is a flow chart of block diagram showing the fabricating process for a preferred exemplary embodiment of the present invention.
Figure 2:
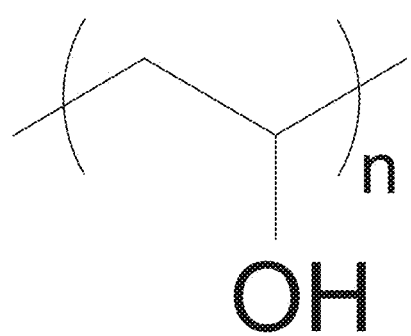
FIG. 2 is a chemical structure of the Polyvinyl Alcohol (PVA) used in the present invention.
Figure 3:
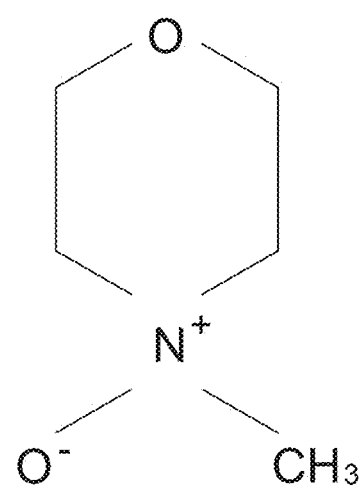
FIG. 3 is a chemical structure of the N-methylmorpholine N-oxide (NMMO) solvent used in the present invention.
Figure 4:
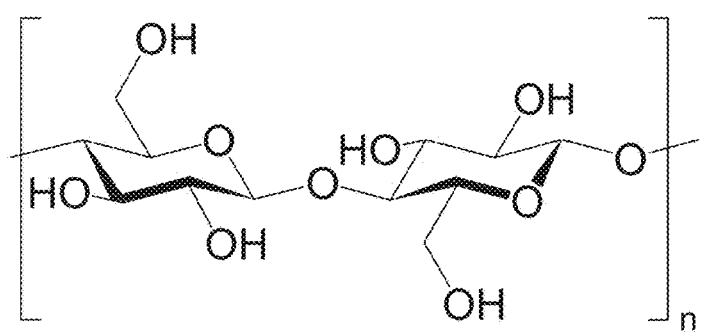
FIG. 4 is a chemical structure of the pulp cellulose used in the present invention.

(a) Put partially alkalized polyvinyl alcohol (PVA) power together with silver nitrate ($AgNO_3$) solution as precursor thereof into pure water for agitating to form polyvinyl alcohol (PVA) solution in gel state such that the alkalization degree and the molecular weight of partially alkalized polyvinyl alcohol (PVA) power added is 86-89 mole % and 14,700-98,000 respectively while the weight percentage of polyvinyl alcohol (PVA) solution is 5-12 wt %, and the concentration of polyvinyl alcohol (PVA) solution is good enough to enclose and protect the micro silver particles formed therein because the polyvinyl alcohol (PVA) features in low polymerization degree and water-solubility at low temperature, and the silver nitrate ($AgNO_3$) solution is created by dissolving the silver nitrate ($AgNO_3$) crystal into pure water, as well as the chemical structure of the polyvinyl alcohol (PVA) used here is shown as in FIG. 2;

(b) Put sodium borohydride ($NaBH_4$) into the gel state polyvinyl alcohol (PVA) solution for reduction titration by agitating to form nano silver colloidal sol such that the reduction titration is performed by sodium borohydride ($NaBH_4$) with mole ratio in range of 1:4-1:8, titration speed in range of 5-15 ml/min, agitating frequency about 200 rpm, and titration time in range of 10-20 minutes, and the concentration of produced nano silver sol is in range of 500-20,000 ppm while the diameter of the nano silver particle is in range of 10-150 nm;

(c) Put the nano silver colloidal sol into a mixing cellulose serum of wood pulp raw material and N-methylmorpholine N-oxide (NMMO) solvent for blending process to prepare blending mucilage such that the blending process is performed by putting raw material of chipped wood pulp, solvent of N-methylmorpholine N-oxide (NMMO), and stabilizer together into an expansion dissolving tank with constant temperature in range of 60-80 degrees centigrade (° C.) for blending agitation, and in association of dehydration in a vacuum condensing equipment with vacuum about 933 micro-Pa. Wherein, the raw material wood pulp is a mixture of soft wood and hard wood with blending weight ratio thereof in range of 0:100-100:0, and the content of α-cellulose is over 85% while the polymerization degree for the cellulose of wood pulp thereof is in range of 500-1200, and the weight percentage for the nano silver sol in the prepared blending mucilage is in range of 5-35 wt % while the concentration of the nano silver particle therein is in range of 100-5000 ppm, as well as the chemical structures of the N-methylmorpholine N-oxide (NMMO) and pulp cellulose used here are shown as in FIGS. 3 and 4 respectively;

(d) Evaporate water contained in the blending mucilage of nano silver colloidal sol and natural cellulose of wood pulp to form spinning dope by heating via a Thin Film Evaporator (TFE) under vacuum in range of 939-926 micro-Pa, heating temperature in range of 80-130 degrees centigrade (° C.) to dehydrate water down to range of 9-18% in time range of 5-10 minutes so that the wood cellulose is dissolved into spinning dope owing to following mechanism for the blending process to prepare blending mucilage in previous step c, wherein other than both phases of natural cellulose of wood pulp and nano silver sol in the blending mucilage being able mutually penetrate each other and tightly bond together due to mutual compatibility, the shearing actions caused by mechanical agitation in the expansion dissolving tank make it as structure of continuous phase such that not only the stability of the is enhanced in proportional to promotion of uniformization degree for both phases but also even distribution of the nano silver particle in the spinning dope is ensured definitely with parameters that the composition percentages for all constituents in the spinning dope as following: the percentage of water ($H_2O$) is in range of 9-18%, the percentage of N-methylmorpholine N-oxide (NMMO) is in range of 75-87%, and the percentage of cellulose is in range of 6-11%;

(e) Spin the spinning dope via "spunbond spinning method" by means of firstly conveying the spinning dope via boosted pressure to a continuous polymer filter (CPF) for filtration and defoaming treatment, secondly feeding the spinning dope into a spinning block for heating to melt the spinning dope by means of constantly blowing hot air into the spinning block, and finally spunbond extruding the melted spinning dope out of spinnerets to form into molten filament tow by means of jetting chilly quenching air through conical-frustum shell-shaped air gaps sheathing the spinnerets for quenched stretching process;

(f) By means of coagulation bath, feed the molten filament tow in a coagulation liquid for coagulation, regeneration, and water rinse such that the concentration of the coagulation liquid is in range of 2.5-7.0%, and the residual quantity percentage of the N-methylmorpholine N-oxide (NMMO) solvent is less than 0.1% while the residual quantity percentage of the polyvinyl alcohol (PVA) solution is less than 0.2%, both of which become leftover mixture of residual N-methylmorpholine N-oxide (NMMO) solvent and residual polyvinyl alcohol (PVA) solution; and (g) By means of airflow draw stretcher, lay and stack the molten filament tow out of coagulation bath onto a collecting net to form a fibrous web of nonwoven substrate for high-speed stretching process under high pressure condition, and after post treatments of hydro-entangled needle punching, drying, winding-up processes have been orderly applied on the fibrous web of nonwoven substrate, then the spunbond nonwoven of natural cellulose fiber blended with nano silver is fabricated completely.

In previous step f, the residual polyvinyl alcohol (PVA) solution and residual N-methylmorpholine N-oxide (NMMO) solvent in the leftover mixture aforesaid after coagulation, regeneration and water rinse should be further treated.

For separating out polyvinyl alcohol (PVA) solution, the process is performed in following steps: firstly, feed the leftover mixture of residual N-methylmorpholine N-oxide (NMMO) solvent and residual polyvinyl alcohol (PVA) solution into a chromatography tank, and add glauber ($Na_2SO_4$) of 100 g/L together with borax ($Na_2B_4O_7.10H_2O$) of 16.7 g/L therein; secondly, add slight sodium carbonate ($Na_2CO_3$) therein to serve as pH modifier; and finally, the overall chemical reactions in the chromatography tank make the polyvinyl alcohol (PVA) solution be condensing, gelling and separating out so that the sorted polyvinyl alcohol (PVA) can be isolated from the N-methylmorpholine N-oxide (NMMO) solvent to avoid from affecting the recycling process of N-methylmorpholine N-oxide (NMMO) solvent.

For recycling N-methylmorpholine N-oxide (NMMO) solvent in the leftover mixture of residual N-methylmorpholine N-oxide (NMMO) solvent and residual polyvinyl alcohol (PVA) solution, the process is performed in following steps:

A. First Filtration:

Perform the first filtration for the initial leftover mixture of residual N-methylmorpholine N-oxide (NMMO) solvent and residual polyvinyl alcohol (PVA) solution to filter out residual N-methylmorpholine N-oxide (NMMO) solvent by means of pleated polypropylene (PP) filter cartridge of 1-20μ;

B. Flocculation:

Put the treated N-methylmorpholine N-oxide (NMMO) solvent from previous first filtration together with flocculant and necessary additive of 1.5 mg/L into a flocculation tank for flocculation with duration for 1 hour such that colloidal impurities is aggregated into clumping while the insoluble impurities is coagulated into polymerized floc due to function of existing flocculant so that amassed clumping and floc will start sedimentation and discharge through filtering net.

C. Purification:

Feed the treated N-methylmorpholine N-oxide (NMMO) solvent from previous flocculation into a purification system for ion exchange for purification under pH value in range of 8-9 so that not only the color impurities is separated out but also the purification is enhanced.

D. Second Filtration:

Perform the second filtration for the treated N-methylmorpholine N-oxide (NMMO) solvent from previous purification by means of Ultra-filter (UF) and reverse osmosis (RO) filter; and E. Condensation:

Perform the circulated condensation for the treated N-methylmorpholine N-oxide (NMMO) solvent (3.0-6.0%) from previous second filtration by circulation of multi-stage evaporation tank system so that not only the purity of the recycled N-methylmorpholine N-oxide (NMMO) solvent is gradually enhanced up to 50.0-78.0% but also the recycling rate thereof is promoted over 99.5%. Thus, the recycled N-methylmorpholine N-oxide (NMMO) solvent is good enough to be reused in the fabricating process of the present invention In order to further prove and justify foregoing features and practical effects, some preferred exemplary embodiments are described below.

First exemplary embodiment: (Preparation for base samples 1-22)

Figure 5:
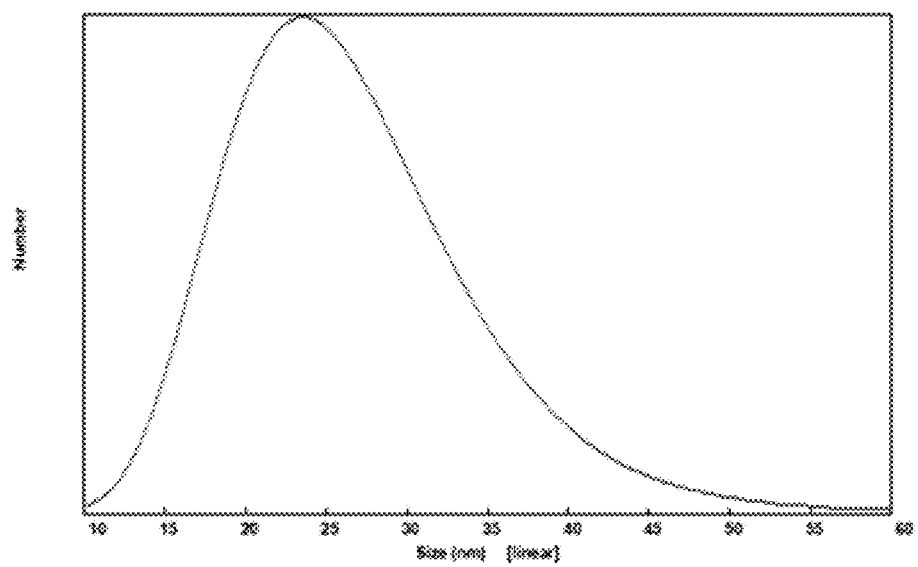
FIG. 5 is a distribution chart of suspended particle size for nano silver colloidal sol of 1000 ppm used in the present invention.
Figure 6:
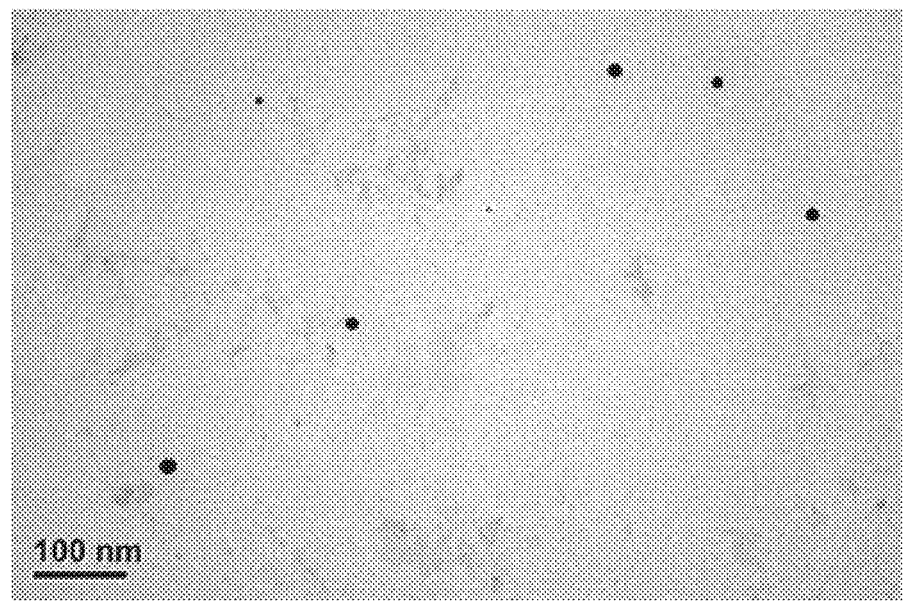
FIG. 6 is a Transmission Electron Microscopic graph (TEM) for nano silver colloidal sol of 100 times dilution used in the present invention.

Put partially alkalized polyvinyl alcohol (PVA) power of 5.0 g and silver nitrate ($AgNO_3$) solution of suitable quantity into pure water of 95.0 g to agitate for 2 hours to form polyvinyl alcohol (PVA) solution in gel state with 0.1 molar concentration (M) of 0.5 ml, and put sodium borohydride ($NaBH_4$) with 0.2 molar concentration (M) into the gel state polyvinyl alcohol (PVA) solution for reduction titration by agitating to obtain nano silver colloidal sol of 1000 ppm, wherein the color of the polyvinyl alcohol (PVA) gel will from initial translucent color gradually turn into yellow, light brown, deep brown and final dark brown upon end of the reduction titration. FIG. 5 is a distribution chart of suspended particle size for nano silver colloidal sol of 1000 ppm obtained from process aforesaid. According to analysis of the FIG. 5, the suspended particle size for nano silver colloidal sol of 1000 ppm mainly spreads in the range of 7-115 nm while the average diameter of the suspended particle is about 23.5 nm. Moreover, FIG. 6 is a Transmission Electron Microscopic graph (TEM) for nano silver colloidal sol of 100 times dilution obtained from process aforesaid. According to illustration of the FIG. 6, it is apparent that the suspended particle size less than 100 nm can be obtained from foregoing process of the present invention.

Second Exemplary Embodiment

Object

For the purpose of obtaining samples 1-11 of spunbond nonwoven from natural cellulose fiber blended with nano silver of the present invention as antibacterial sample to assess the antibacterial capability against experiment bacterial strain of Methicillin Resistant *Staphyloccous Aureus* (MRSA) (ATCC 6538P) via modification of the base samples 1-11 from Table 1 such that the right three columns of Tables 2 lists testing results in antibacterial capability for samples 1-22 of spunbond nonwoven from natural cellulose fiber blended with nano silver of the present invention.

The second exemplary embodiment is performed in following steps:

Firstly, mix wood pulp for polymerization degree of cellulose in 650 with N-methylmorpholine N-oxide (NMMO) solvent to create a mixing cellulose serum, and add put a nano silver colloidal sol with weight percentage of 5-35 wt % into the mixing cellulose serum for blending process to prepare a blending mucilage with concentration of nano silver particle in range of 100-5000 ppm;

Secondly, evaporate water contained in the blending mucilage by heating via a Thin Film Evaporator (TFE) under heating temperature in range of 80-130 degrees centigrade (° C.) to dehydrate water down to range of 9-13% in 5 minutes to form a spinning dope with sample Composition for testing samples 1-11 of spinning dope as shown in the upper half portion of Table-1;

Thirdly, spin the spinning dope via "spunbond spinning method" by means of firstly conveying the spinning dope via boosted pressure to a continuous polymer filter (CPF) for filtration and defoaming treatment, secondly feeding the spinning dope into a spinning block for heating to melt the spinning dope by means of constantly blowing hot air into the spinning block, and finally spunbond extruding the melted spinning dope out of spinnerets to form into molten filament tow by means of jetting chilly quenching air through conical-frustum shell-shaped air gaps sheathing the spinnerets for quenched stretching process; and Finally, by means of airflow draw stretcher, lay and stack the molten filament tow out of coagulation bath onto a collecting net to form a fibrous web of nonwoven substrate for high-speed stretching process under high pressure condition, and after post treatments of hydro-entangled needle punching, drying, winding-up processes have been orderly applied on the fibrous web of nonwoven substrate, then the spunbond nonwoven of natural cellulose fiber blended with nano silver is fabricated completely having antibacterial capability against experiment bacterial strain of Methicillin Resistant *Staphyloccous Aureus* (MRSA) (ATCC 6538P) via modification of the base samples 1-11 from Table 1 such that the right three columns of Tables 2 lists testing results in antibacterial capability for samples 1-22 of spunbond nonwoven from natural cellulose fiber blended with nano silver of the present invention.

Third Exemplary Embodiment

Object

For the purpose of obtaining samples 12-22 of spunbond nonwoven from natural cellulose fiber blended with nano silver of the present invention as antibacterial sample to assess the antibacterial capability against experiment bacterial strain of *Klebsiella Pheumoniae* (ATCC 4352) via modification of the base samples 12-22 from Table 1 such that the right three columns of Tables 3 lists testing results in antibacterial capability for samples 1-22 of spunbond nonwoven from natural cellulose fiber blended with nano silver of the present invention.

The third exemplary embodiment is performed in following steps:

Firstly, mix wood pulp for polymerization degree of cellulose in 1050 with N-methylmorpholine N-oxide (NMMO) solvent to create a mixing cellulose serum, and add put a nano silver colloidal sol with weight percentage of 5-35 wt % into the mixing cellulose serum for blending process to prepare a blending mucilage with concentration of nano silver particle in range of 100-5000 ppm;

Secondly, evaporate water contained in the blending mucilage by heating via a Thin Film Evaporator (TFE) under heating temperature in range of 80-130 degrees centigrade (° C.) to dehydrate water down to range of 9-13% in 5 minutes to form a spinning dope with sample Composition for testing samples 1-11 of spinning dope as shown in the upper half portion of Table-1;

Thirdly, spin the spinning dope via "spunbond spinning method" by means of firstly conveying the spinning dope via boosted pressure to a continuous polymer filter (CPF) for filtration and defoaming treatment, secondly feeding the spinning dope into a spinning block for heating to melt the spinning dope by means of constantly blowing hot air into the spinning block, and finally spunbond extruding the melted spinning dope out of spinnerets to form into molten filament tow by means of jetting chilly quenching air through conical-frustum shell-shaped air gaps sheathing the spinnerets for quenched stretching process; and Finally, by means of airflow draw stretcher, lay and stack the molten filament tow out of coagulation bath onto a collecting net to form a fibrous web of nonwoven substrate for high-speed stretching process under high pressure condition, and after post treatments of hydro-entangled needle punching, drying, winding-up processes have been orderly applied on the fibrous web of nonwoven substrate, then the spunbond nonwoven of natural cellulose fiber blended with nano silver is fabricated completely having antibacterial capability against experiment bacterial strain of *Klebsiella Pheumoniae* (ATCC 4352) via modification of the base samples 12-22 from Table 1 such that the right three columns of Tables 3 lists testing results in antibacterial capability for samples 1-22 of spunbond nonwoven from natural cellulose fiber blended with nano silver of the present invention.

TABLE 1

Sample Composition for base samples of spinning dope

| Sample | PMDC | BRSS (wt %) | CNSP (ppm) | CCBS (%) | SCBS (%) | MCBS (%) |
|---|---|---|---|---|---|---|
| 1 | 650 | 5 | 100 | 10.4 | 81.1 | 8.5 |
| 2 | 650 | 8 | 500 | 10.2 | 81.6 | 8.2 |
| 3 | 650 | 11 | 1000 | 10.3 | 80.4 | 9.3 |
| 4 | 650 | 14 | 1500 | 10.7 | 80.0 | 9.3 |
| 5 | 650 | 17 | 2000 | 10.7 | 81.0 | 8.3 |
| 6 | 650 | 20 | 2500 | 11.4 | 80.4 | 8.2 |
| 7 | 650 | 23 | 3000 | 10.3 | 80.8 | 8.9 |
| 8 | 650 | 26 | 3500 | 11.1 | 81.5 | 7.4 |
| 9 | 650 | 29 | 4000 | 10.2 | 81.2 | 8.6 |
| 10 | 650 | 32 | 4500 | 10.8 | 81.3 | 7.9 |
| 11 | 650 | 35 | 5000 | 10.8 | 81.0 | 8.2 |
| 12 | 1050 | 5 | 100 | 10.6 | 80.7 | 8.7 |
| 13 | 1050 | 8 | 500 | 10.3 | 81.0 | 8.7 |
| 14 | 1050 | 11 | 1000 | 10.1 | 81.1 | 8.8 |
| 15 | 1050 | 14 | 1500 | 11.4 | 81.0 | 7.6 |
| 16 | 1050 | 17 | 2000 | 10.7 | 80.5 | 8.8 |
| 17 | 1050 | 20 | 2500 | 11.3 | 81.3 | 7.4 |
| 18 | 1050 | 23 | 3000 | 10.4 | 80.4 | 9.2 |
| 19 | 1050 | 26 | 3500 | 10.7 | 81.3 | 8.0 |
| 20 | 1050 | 29 | 4000 | 10.2 | 82.0 | 7.8 |
| 21 | 1050 | 32 | 4500 | 11.5 | 80.2 | 8.3 |
| 22 | 1050 | 35 | 5000 | 11.2 | 80.6 | 8.2 |

Notation
PMDC denotes to polymerization degree of cellulose
BRSS denotes to blending ratio of nano silver sol
CNSP denotes to concentration of nano silver particles
CCBS denotes to cellulose content in blending solution
SCBS denotes to solvent content in blending solution
MCBS denotes to moisture content in blending solution Fourth Exemplary Embodiment Assessment for Antibacterial Capability Testing Object:
Take subject spunbond nonwoven from natural cellulose fiber blended with nano silver of the present invention as antibacterial sample to determine the degree of antibacterial capability respectively.

Testing Bacterial Strains:
Adopt type (A) bacteria: Methicillin Resistant *Staphyloccous Aureus* (MRSA) (ATCC 6538P) and type (B) bacteria: *Klebsiella Pheumoniae* (ATCC 4352) as two experiment bacterial strains.

Principle:
In a nano silver sol, which is a colloidal suspension of very small solid nano silver particles in a continuous liquid medium, the solid nano silver particles are charged with anions while the bacterial cell membranes of the testing bacterial strains are charged with cations. A Dehydrogenase-Superantigen (SAg) structure is created when both the solid nano silver particles with anions and bacterial cell membranes of the testing bacterial strains with cations are chemically combined together. Thereby, the bacterial cell membranes of the testing bacterial strains will gradually fade away and become perforation with results that massive drainage of reduction sugar, protein and potassium ions is caused, as well as membrane potential thereof and Adenosine triphosphate (ATP) are exhausted because the solid nano silver particles in the testing bacterial strains can spoil bacterial activity and DNA, interrupt bacterial signal transmission and further inhibit growth of the testing bacterial strains. Finally, the testing bacterial strains will die because they are neither to breathe and metabolism nor reproduction.

Tables 2 and 3 list testing results in antibacterial capability for subject spunbond nonwoven from natural cellulose fiber blended with nano silver of the present invention.

Foundation:
The experiment is in accordance with JIS L1902-1998 Quantitative Method.

Testing Bacterial Strains:
Adopt type (A) bacteria: Methicillin Resistant *Staphyloccous Aureus* (MRSA) (ATCC 6538P) and type (B) bacteria: *Klebsiella Pheumoniae* (ATCC 4352) as two experiment bacterial strains.

Experiment:
The concentration of incubated testing bacterial strain (TBS) within 1.0±0.3 E+5 (number/ml) means valid for the experiment.

Ma denotes bacteria number for testing bacterial strain (TBS) of un-processed sample in immediate count upon cleansing without incubation.

Mb denotes bacteria number for testing bacterial strain (TBS) of un-processed sample after being incubated for 18~24 hours.

Mc denotes bacteria number for testing bacterial strain (TBS) of processed sample after being incubated for 18~24 hours.

Calculating Formula:
The growing activity value of the testing bacterial strain (TBS) is denoted as "BGA", which is calculated by following formula such that BGA>1.5 means valid of the experiment.

$$BGA = \log(Mb) - \log(Ma) \quad \text{Growing Activity value of the TBS:}$$

$$BSN = \log(Mb) - \log(Mc) \quad \text{Bacteriostatic value of the sample:}$$

$$BKN = \log(Ma) - \log(Mc) \quad \text{Bactericidal value of the sample:}$$

Evaluating Criterion:

According to criterion from the Japan Association of Fiber Evaluating Technology (JAFET) for new function, the antibacterial capability is that:

The testing sample has bacteriostatic effect if its bacteriostatic value BSN>2.2.

The testing sample has bactericidal effect if its bactericidal value BKN>0.

And, the numerical (1.3 E+4) denotes 13,000 with analog below.

Each testing result in antibacterial capability for each respective sample is listed in Tables 2 and 3.

The upper half portion and lower half portion of Table-2 shows the antibacterial capability to the bacterial strains of Methicillin Resistant *Staphyloccous Aureus* (MRSA) (ATCC 6538P) for spunbond nonwoven from natural cellulose fiber blended with nano silver for samples 1-11 and 12-22 respectively while the upper half portion and lower half portion of Table-3 shows the antibacterial capability to the bacterial strains of *Klebsiella Pheumoniae* (ATCC 4352) for spunbond nonwoven from natural cellulose fiber blended with nano silver for samples 1-11 and 12-22 respectively, and all sample compositions in both of Table-2 and Table-3 are based on the first exemplary embodiment.

TABLE 2

Antibacterial capability for spunbond nonwoven from natural cellulose fiber blended with nano silver

| Sample | PMDC | BRSS (wt %) | CNSP (ppm) | ABCF | SRCF | TSRT (Yes/No) |
|---|---|---|---|---|---|---|
| 1 | 650 | 5 | 100 | >1.7 | >2.0 | No |
| 2 | 650 | 8 | 500 | >1.8 | >1.6 | No |
| 3 | 650 | 11 | 1000 | >1.7 | >2.0 | No |
| 4 | 650 | 14 | 1500 | >3.0 | >3.2 | Yes |
| 5 | 650 | 17 | 2000 | >3.4 | >3.5 | Yes |
| 6 | 650 | 20 | 2500 | >4.2 | >4.7 | Yes |
| 7 | 650 | 23 | 3000 | >4.6 | >4.6 | Yes |
| 8 | 650 | 26 | 3500 | >4.9 | >4.7 | Yes |
| 9 | 650 | 29 | 4000 | >5.1 | >4.7 | Yes |
| 10 | 650 | 32 | 4500 | >5.3 | >4.6 | Yes |
| 11 | 650 | 35 | 5000 | >4.6 | >4.8 | Yes |
| 12 | 1050 | 5 | 100 | >1.6 | >2.1 | No |
| 13 | 1050 | 8 | 500 | >1.8 | >2.0 | No |
| 14 | 1050 | 11 | 1000 | >1.7 | >1.8 | No |
| 15 | 1050 | 14 | 1500 | >3.9 | >3.9 | Yes |
| 16 | 1050 | 17 | 2000 | >4.6 | >4.7 | Yes |
| 17 | 1050 | 20 | 2500 | >4.4 | >4.5 | Yes |
| 18 | 1050 | 23 | 3000 | >4.3 | >4.9 | Yes |
| 19 | 1050 | 26 | 3500 | >4.4 | >4.8 | Yes |
| 20 | 1050 | 29 | 4000 | >4.6 | >4.9 | Yes |
| 21 | 1050 | 32 | 4500 | >4.7 | >4.8 | Yes |
| 22 | 1050 | 35 | 5000 | >4.9 | >5.0 | Yes |

Testing Method JIS L1902-1998 Quantitative Method
Testing bacterial strains Methicillin Resistant *Staphyloccous Aureus* (MRSA) (ATCC 6538P)
Notation
PMDC denotes to polymerization degree of cellulose
BRSS denotes to blending ratio of nano silver sol
CNSP denotes to concentration of nano silver particles
ABCF denotes to antibacterial value of meltblown nonwoven from natural cellulose fiber
SRCF denotes to sterilization value of meltblown nonwoven from natural cellulose fiber
TSRT denotes to testing results for (Yes/No)
Interpretation
The upper half portion and lower half portion of Table-2 shows the antibacterial capability to the bacterial strains of Methicillin Resistant *Staphyloccous Aureus* (MRSA) (ATCC 6538P) for spunbond nonwoven from natural cellulose fiber blended with nano silver for samples 1-11 and 12-22 respectively, and all sample compositions in the Table-2 are based on the first exemplary embodiment.

TABLE 3

Antibacterial capability for spunbond nonwoven from natural cellulose fiber blended with nano silver

| Sample | PMDC | BRSS (wt %) | CNSP (ppm) | ABCF | SRCF | TSRT (Yes/No) |
|---|---|---|---|---|---|---|
| 1 | 650 | 5 | 100 | >1.6 | >1.7 | No |
| 2 | 650 | 8 | 500 | >1.8 | >2.0 | No |
| 3 | 650 | 11 | 1000 | >1.7 | >2.2 | No |
| 4 | 650 | 14 | 1500 | >3.9 | >4.0 | Yes |
| 5 | 650 | 17 | 2000 | >4.1 | >4.2 | Yes |
| 6 | 650 | 20 | 2500 | >4.0 | >4.1 | Yes |
| 7 | 650 | 23 | 3000 | >4.1 | >4.0 | Yes |
| 8 | 650 | 26 | 3500 | >4.8 | >4.7 | Yes |
| 9 | 650 | 29 | 4000 | >5.1 | >4.9 | Yes |
| 10 | 650 | 32 | 4500 | >5.3 | >4.9 | Yes |
| 11 | 650 | 35 | 5000 | >5.1 | >5.2 | Yes |
| 12 | 1050 | 5 | 100 | >1.8 | >1.8 | No |
| 13 | 1050 | 8 | 500 | >2.2 | >2.0 | No |
| 14 | 1050 | 11 | 1000 | >1.9 | >1.9 | No |
| 15 | 1050 | 14 | 1500 | >4.1 | >4.0 | Yes |
| 16 | 1050 | 17 | 2000 | >4.2 | >3.9 | Yes |
| 17 | 1050 | 20 | 2500 | >4.1 | >4.6 | Yes |
| 18 | 1050 | 23 | 3000 | >4.2 | >4.5 | Yes |
| 19 | 1050 | 26 | 3500 | >4.6 | >4.7 | Yes |
| 20 | 1050 | 29 | 4000 | >4.9 | >4.7 | Yes |
| 21 | 1050 | 32 | 4500 | >5.0 | >5.1 | Yes |
| 22 | 1050 | 35 | 5000 | >4.9 | >4.9 | Yes |

Testing Method JIS L1902-1998 Quantitative Method
Testing bacterial strains *Klebsiella Pheumoniae* (ATCC 4352)
Notation
PMDC denotes to polymerization degree of cellulose
BRSS denotes to blending ratio of nano silver sol
CNSP denotes to concentration of nano silver particles
ABCF denotes to antibacterial value of spunbond nonwoven from natural cellulose fiber
SRCF denotes to sterilization value of spunbond nonwoven from natural cellulose fiber
TSRT denotes to testing results for (Yes/No)
Interpretation
The upper half portion and lower half portion of Table-3 shows the antibacterial capability to the bacterial strains of *Klebsiella Pheumoniae* (ATCC 4352) for spunbond nonwoven from natural cellulose fiber blended with nano silver for samples 1-11 and 12-22 respectively, and all sample compositions in the Table-3 are based on the first exemplary embodiment.

Tables-2 and 3 respectively show the antibacterial capability to the bacterial strains of Methicillin Resistant *Staphyloccous Aureus* (MRSA) (ATCC 6538P) and *Klebsiella Pheumoniae* (ATCC 4352) for spunbond nonwoven from natural cellulose fiber blended with nano silver for all samples 1-22. According to Tables 2 and 3, the subject spunbond nonwoven from natural cellulose fiber blended with nano silver of the present invention has good bacteriostatic and bactericidal effects to the testing bacterial strains of type (A) bacteria: Methicillin Resistant *Staphyloccous Aureus* (MRSA) (ATCC 6538P) and type (B) bacteria: *Klebsiella Pheumoniae* (ATCC 4352).

Fifth Exemplary Embodiment

Assessment for Antibacterial Capability after i0 Times of Water Laundering

The experimental results in antibacterial capability for all samples of spunbond nonwoven from natural cellulose fiber blended with nano silver are listed in Table 4, wherein each sample has been treated with 10 times of water laundering in 70 degrees centigrade (70° C.) hot water with 5 grams per liter (5 g/L) detergent for 45 minutes are tabulated in Table-4.

TABLE 4

Antibacterial capability for spunbond nonwoven from natural cellulose fiber blended with nano silver after i0 times of water laundering

| Sample | PMDC | BRSS (wt %) | CNSP (ppm) | ABCF | SRCF | TSRT (Yes/No) |
|---|---|---|---|---|---|---|
| 1 | 650 | 5 | 100 | >1.4 | >1.2 | No |
| 2 | 650 | 8 | 500 | >1.3 | >1.2 | No |
| 3 | 650 | 11 | 1000 | >1.5 | >1.8 | No |
| 4 | 650 | 14 | 1500 | >1.6 | >1.9 | No |
| 5 | 650 | 17 | 2000 | >1.4 | >1.7 | No |
| 6 | 650 | 20 | 2500 | >1.6 | >1.6 | No |
| 7 | 650 | 23 | 3000 | >3.9 | >3.4 | Yes |
| 8 | 650 | 26 | 3500 | >4.1 | >4.1 | Yes |
| 9 | 650 | 29 | 4000 | >4.1 | >4.0 | Yes |
| 10 | 650 | 32 | 4500 | >5.1 | >4.6 | Yes |
| 11 | 650 | 35 | 5000 | >5.1 | >4.7 | Yes |
| 12 | 1050 | 5 | 100 | >1.6 | >1.1 | No |
| 13 | 1050 | 8 | 500 | >1.4 | >1.3 | No |
| 14 | 1050 | 11 | 1000 | >1.2 | >1.8 | No |
| 15 | 1050 | 14 | 1500 | >1.8 | >1.4 | No |
| 16 | 1050 | 17 | 2000 | >1.3 | >1.8 | No |
| 17 | 1050 | 20 | 2500 | >3.9 | >3.2 | Yes |
| 18 | 1050 | 23 | 3000 | >4.7 | >4.1 | Yes |
| 19 | 1050 | 26 | 3500 | >4.6 | >4.4 | Yes |
| 20 | 1050 | 29 | 4000 | >4.9 | >4.2 | Yes |
| 21 | 1050 | 32 | 4500 | >4.7 | >4.4 | Yes |
| 22 | 1050 | 35 | 5000 | >4.8 | >4.5 | Yes |

Testing Method JIS L1902-1998 Quantitative Method
Testing bacterial strains Klebsiella Pheumoniae (ATCC 4352)
Notation
PMDC denotes to polymerization degree of cellulose
BRSS denotes to blending ratio of nano silver sol
CNSP denotes to concentration of nano silver particles
ABCF denotes to antibacterial value of spunbond nonwoven from natural cellulose fiber
SRCF denotes to sterilization value of spunbond nonwoven from natural cellulose fiber
TSRT denotes to testing results for (Yes/No)
Interpretation
The upper half portion and lower half portion of Table-4 shows the antibacterial capability for spunbond nonwoven from natural cellulose fiber blended with nano silver after i0 times of water laundering for samples 1-11 and 12-22 respectively, and all sample compositions in the Table-4 are based on the first exemplary embodiment.

Tables-2 and 3 respectively show the antibacterial capability to the bacterial strains of Methicillin Resistant *Staphyloccous Aureus* (MRSA) (ATCC 6538P) and *Klebsiella Pheumoniae* (ATCC 4352) for spunbond nonwoven from natural cellulose fiber blended with nano silver for all samples 1-22. According to Tables 2 and 3, the subject spunbond nonwoven from natural cellulose fiber blended with nano silver of the present invention has bactericidal effects if the concentration of nano silver particles (CNSP) reaches 100 ppm, and has excellent bacteriostatic effects if the concentration of nano silver particles (CNSP) reaches 1500 ppm, which proves and justifies that the subject spunbond nonwoven from natural cellulose fiber blended with nano silver of the present invention can definitely be modified to reach a level to have antibacterial capability, and the antibacterial capability thereof is increased in proportional to the raise for the concentration of nano silver particles (CNSP).

Table-4 shows that the antibacterial capability for spunbond nonwoven from natural cellulose fiber blended with nano silver after i0 times of hot water laundering with detergent put therein for all samples 1-122 remains over 90% antibacterial capability as original antibacterial capability before water laundering, which proves and justifies that the subject spunbond nonwoven from natural cellulose fiber blended with nano silver of the present invention has better long-lasting antibacterial capability than conventional counterparts available in the market, which is either treated with different surfactants or added with various additives.

Sixth Exemplary Embodiment

Assessment for Antistatic Capability

The assessment in antistatic capability for all samples of spunbond nonwoven from natural cellulose fiber blended with nano silver is performed on the basis of criteria of "Specified Requirements of Antistatic Textiles" (FTTS-FA-009) from "Committee for Conformity Assessment of Accreditation and Certification on Functional and Technical Textiles" in the Republic of China (www.ftts.org.tw) and specification of "Electrical Surface Resistivity of Fabrics" (AATCC76) from American Association of Textile Chemists and Colorists (AATCC), wherein each sample has been tested with surface resistivity via concentric electrode to determine the degree of antistatic capability respectively.

TABLE 5

Antistatic capability for spunbond nonwoven from natural cellulose fiber blended with nano silver

| Sample | PMDC | BRSS (wt %) | CNSP (ppm) | SRCF ($\Omega$) | TSRT (Grade) |
|---|---|---|---|---|---|
| 1 | 650 | 5 | 100 | $6.98 \times 10^{10}$ | 1 |
| 2 | 650 | 8 | 500 | $7.29 \times 10^{9}$ | 2 |
| 3 | 650 | 11 | 1000 | $7.02 \times 10^{9}$ | 2 |
| 4 | 650 | 14 | 1500 | $6.96 \times 10^{9}$ | 2 |
| 5 | 650 | 17 | 2000 | $5.02 \times 10^{9}$ | 2 |
| 6 | 650 | 20 | 2500 | $2.89 \times 10^{9}$ | 2 |
| 7 | 650 | 23 | 3000 | $1.77 \times 10^{9}$ | 2 |
| 8 | 650 | 26 | 3500 | $1.01 \times 10^{9}$ | 2 |
| 9 | 650 | 29 | 4000 | $8.42 \times 10^{8}$ | 2 |
| 10 | 650 | 32 | 4500 | $6.54 \times 10^{8}$ | 2 |
| 11 | 650 | 35 | 5000 | $3.65 \times 10^{8}$ | 2 |
| 12 | 1050 | 5 | 100 | $8.52 \times 10^{10}$ | 1 |
| 13 | 1050 | 8 | 500 | $7.21 \times 10^{9}$ | 2 |
| 14 | 1050 | 11 | 1000 | $6.29 \times 10^{9}$ | 2 |
| 15 | 1050 | 14 | 1500 | $3.98 \times 10^{9}$ | 2 |
| 16 | 1050 | 17 | 2000 | $3.02 \times 10^{9}$ | 2 |
| 17 | 1050 | 20 | 2500 | $1.51 \times 10^{9}$ | 2 |
| 18 | 1050 | 23 | 3000 | $8.69 \times 10^{8}$ | 2 |
| 19 | 1050 | 26 | 3500 | $7.56 \times 10^{8}$ | 2 |
| 20 | 1050 | 29 | 4000 | $5.45 \times 10^{8}$ | 2 |
| 21 | 1050 | 32 | 4500 | $5.02 \times 10^{8}$ | 2 |
| 22 | 1050 | 35 | 5000 | $4.68 \times 10^{8}$ | 2 |

Notation
PMDC denotes to polymerization degree of cellulose
BRSS denotes to blending ratio of nano silver sol
CNSP denotes to concentration of nano silver particles
SRCF denotes to surface resistivity of spunbond nonwoven from natural cellulose fiber
TSRT denotes to testing results for (Rating Grade)
Interpretation
The upper half portion and lower half portion of Table-5 shows the antistatic capability for spunbond nonwoven from natural cellulose fiber blended with nano silver for samples 1-11 and 12-22 respectively, and all sample compositions in the Table-5 are based on the first exemplary embodiment.

Table-5 shows that the rating grades for testing results (TSRT) in the antistatic capability for spunbond nonwoven from natural cellulose fiber blended with nano silver for all samples 1-22 become "grade 2" if the concentration of nano silver particles (CNSP) is over 100 ppm, which means the subject spunbond nonwoven from natural cellulose fiber blended with nano silver of the present invention certainly has good antistatic capability. Moreover, Table-5 also shows that the surface resistivity (SRCF) in spunbond nonwoven from natural cellulose fiber blended with nano silver for all samples 1-22 proportionally increases to raise for the concentration of nano silver particles (CNSP), which proves and justifies that the subject spunbond nonwoven from natural cellulose fiber blended with nano silver of the present invention has better antistatic capability than conventional counterparts available in the market.

Conclusion of the foregoing disclosure heretofore, the subject spunbond nonwoven from natural cellulose fiber blended with nano silver of the present invention certainly has obvious antibacterial capability, which is not only meet the precise requirement of uniform and consistent antibacterial and sterilization from industrial application but also effectively inhibit and eradicate the proliferation and growth of the microorganism including bacteria, mold or fungus so that it is beneficial to promote healthful, clean and comfortable life because the disease spread is practically controlled in consequence of the prevention from bacterial cross infection. Moreover, the subject spunbond nonwoven from natural cellulose fiber blended with nano silver of the present invention certainly also has good antistatic capability, which effectively avoid negative impact to the human physiological blood circulation, immune system and nervous system from static effect during wearing and taking-off clothes in winter season. More notably, the subject spunbond nonwoven from natural cellulose fiber blended with nano silver of the present invention certainly also has good biodegradable capability since it is fabricated from natural cellulose of wood pulp so that the tremendous impact and burden to the environment caused by the wastes from spent conventional chemical fiber counterparts can be totally eradicated. Accordingly, the subject spunbond nonwoven from natural cellulose fiber blended with nano silver of the present invention meet novelty and practical usage in industry of patentable criterion. Therefore, we submit the patent application for the present invention in accordance with related patent laws for your perusal.

What is claimed is:

1. A fabricating method for spunbond nonwoven from natural cellulose fiber blended with nano silver comprises following steps:
    (a) Put partially alkalized polyvinyl alcohol (PVA) power together with silver nitrate ($AgNO_3$) solution as precursor thereof into pure water for agitating to form polyvinyl alcohol (PVA) solution in gel state such that the alkalization degree and the molecular weight of partially alkalized polyvinyl alcohol (PVA) power added is 86-89 mole % and 14,700-98,000 respectively while the weight percentage of polyvinyl alcohol (PVA) solution is 5-12 wt %, and the silver nitrate ($AgNO_3$) solution is created by dissolving the silver nitrate ($AgNO_3$) crystal into pure water;
    (b) Put sodium borohydride ($NaBH_4$) into the gel state polyvinyl alcohol (PVA) solution for reduction titration by agitating to form nano silver colloidal sol such that the reduction titration is performed by sodium borohydride ($NaBH_4$) with mole ratio in range of 1:4-1:8, titration speed in range of 5-15 ml/min, agitating frequency about 200 rpm, and titration time in range of 10-20 minutes, and the concentration of produced nano silver sol is in range of 500-20,000 ppm while the diameter of the nano silver particle is in range of 10-150 nm;
    (c) Put the nano silver colloidal sol into a mixing cellulose serum of wood pulp raw material and N-methylmorpholine N-oxide (NMMO) solvent for blending process to prepare blending mucilage such that the blending process is performed by putting raw material of chipped wood pulp, solvent of N-methylmorpholine N-oxide (NMMO), and stabilizer together into an expansion dissolving tank with constant temperature in range of 60-80 degrees centigrade (° C.) for blending agitation, and in association of dehydration in a vacuum condensing equipment with vacuum about 933 micro-Pa. Wherein, the raw material wood pulp is a mixture of soft wood and hard wood with blending weight ratio thereof in range of 0:100-100:0, and the content of α-cellulose is over 85% while the polymerization degree for the cellulose of wood pulp thereof is in range of 500-1200, and the weight percentage for the nano silver sol in the prepared blending mucilage is in range of 5-35 wt % while the concentration of the nano silver particle therein is in range of 100-5000 ppm, as well as the chemical structures of the N-methylmorpholine N-oxide (NMMO) and pulp cellulose used here are shown as in FIGS. 3 and 4 respectively;
    (d) Evaporate water contained in the blending mucilage of nano silver colloidal sol and natural cellulose of wood pulp to form spinning dope by heating via a Thin Film Evaporator (TFE) under vacuum in range of 939-926 micro-Pa, heating temperature in range of 80-130 degrees centigrade (° C.) to dehydrate water down to range of 9-18% in time range of 5-10 minutes so that the wood cellulose is dissolved into spinning dope such that the percentage of water ($H_2O$) is in range of 9-18%, the percentage of N-methylmorpholine N-oxide (NMMO) is in range of 75-87%, and the percentage of cellulose is in range of 6-11%;
    (e) Spin the spinning dope via "spunbond spinning method" by means of firstly conveying the spinning dope via boosted pressure to a continuous polymer filter (CPF) for filtration and defoaming treatment, secondly feeding the spinning dope into a spinning block for heating to melt the spinning dope by means of constantly blowing hot air into the spinning block, and finally spunbond extruding the melted spinning dope out of spinnerets to form into molten filament tow by means of jetting chilly quenching air through conical-frustum shell-shaped air gaps sheathing the spinnerets for quenched stretching process;
    (f) By means of coagulation bath, feed the molten filament tow in a coagulation liquid for coagulation, regeneration, and water rinse such that the concentration of the coagulation liquid is in range of 2.5-7.0%, and the residual quantity percentage of the N-methylmorpholine N-oxide (NMMO) solvent is less than 0.1% while the residual quantity percentage of the polyvinyl alcohol (PVA) solution is less than 0.2%, both of which become leftover mixture of residual N-methylmorpholine N-oxide (NMMO) solvent and residual polyvinyl alcohol (PVA) solution; and
    (g) By means of airflow draw stretcher, lay and stack the molten filament tow out of coagulation bath onto a collecting net to form a fibrous web of nonwoven substrate for high-speed stretching process under high pressure condition, and after post treatments of hydro-entangled needle punching, drying, winding-up processes have been orderly applied on the fibrous web of nonwoven substrate, then the spunbond nonwoven of natural cellulose fiber blended with nano silver is fabricated completely.

2. The fabricating method for spunbond nonwoven from natural cellulose fiber blended with nano silver as recited in claim 1, wherein the raw material wood pulp used in the step c is a mixture of soft wood and hard wood with blending ratio thereof in range of 0:100-100:0, and the polymerization degree for the cellulose of wood pulp thereof is in range of 500-1200 while the content of α-cellulose is over 85%.

3. The fabricating method for spunbond nonwoven from natural cellulose fiber blended with nano silver as recited in claim 1, wherein the raw material wood pulp used in the step c is a soft wood, whose polymerization degree for the cellulose of wood pulp is in range of 500-1200 while the content of α-cellulose is over 85%.

4. The fabricating method for spunbond nonwoven from natural cellulose fiber blended with nano silver as recited in claim 1, wherein the raw material wood pulp used in the step c is a hard wood, whose polymerization degree for the cellulose of wood pulp is in range of 500-1200 while the content of α-cellulose is over 85%.

5. The fabricating method for spunbond nonwoven from natural cellulose fiber blended with nano silver as recited in claim 1, wherein the residual polyvinyl alcohol (PVA) solution after coagulation, regeneration and water rinse in step f is further treated for separating out polyvinyl alcohol (PVA) by means of process performed in following steps: firstly, feed the initial residual polyvinyl alcohol (PVA) solution into a chromatography tank, and add glauber ($Na_2SO_4$) of 100 g/L together with borax ($Na_2B_4O_7.10H_2O$) of 16.7 g/L therein, secondly add slight sodium carbonate ($Na_2CO_3$) therein to serve as pH modifier, and finally, the overall chemical reactions in the chromatography tank make the polyvinyl alcohol (PVA) solution be condensing, gelling and separating out.

6. The fabricating method for spunbond nonwoven from natural cellulose fiber blended with nano silver as recited in claim 1, wherein in step f, the residual N-methylmorpholine N-oxide (NMMO) solvent in the leftover mixture aforesaid after coagulation, regeneration and water rinse is further treated for recycling N-methylmorpholine N-oxide (NMMO) solvent such that the process is performed in following steps:

A. First Filtration:
Perform the first filtration for the initial leftover mixture of residual N-methylmorpholine N-oxide (NMMO) solvent and residual polyvinyl alcohol (PVA) solution to filter out residual N-methylmorpholine N-oxide (NMMO) solvent by means of pleated polypropylene (PP) filter cartridge of 1-20µ;

B. Flocculation:
Put the treated N-methylmorpholine N-oxide (NMMO) solvent from previous first filtration together with flocculant and necessary additive of 1.5 mg/L into a flocculation tank for flocculation with duration for 1 hour such that colloidal impurities is aggregated into clumping while the insoluble impurities is coagulated into polymerized floc due to function of existing flocculant so that amassed clumping and floc will start sedimentation and discharge through filtering net;

C. Purification:
Feed the treated N-methylmorpholine N-oxide (NMMO) solvent from previous flocculation into a purification system for ion exchange for purification under pH value in range of 8-9 so that not only the color impurities is separated out but also the purification is enhanced;

D. Second Filtration:
Perform the second filtration for the treated N-methylmorpholine N-oxide (NMMO) solvent from previous purification by means of Ultra-filter (UF) and reverse osmosis (RO) filter; and E. Condensation:
Perform the circulated condensation for the treated N-methylmorpholine N-oxide (NMMO) solvent (3.0-6.0%) from previous second filtration by circulation of multi-stage evaporation tank system so that the purity of the recycled N-methylmorpholine N-oxide (NMMO) solvent is gradually enhanced up to 50.0-78.0%.

\* \* \* \* \*